(12) United States Patent
Clark et al.

(10) Patent No.: US 12,316,179 B2
(45) Date of Patent: May 27, 2025

(54) FAULT-TOLERANT AXIAL-GAP PERMANENT-MAGNET ELECTRIC MACHINE

(71) Applicant: LaunchPoint Electric Propulsion Solutions, Inc., Goleta, CA (US)

(72) Inventors: Brian J. Clark, Santa Barbara, CA (US); Michael R. Ricci, Camarillo, CA (US); David B. Paden, Goleta, CA (US); Bradley E. Paden, Goleta, CA (US)

(73) Assignee: LaunchPoint Electric Propulsion Solutions, Inc., Goleta, CA (US)

( * ) Notice: Subject to any disclaimer, the term of this patent is extended or adjusted under 35 U.S.C. 154(b) by 323 days.

(21) Appl. No.: 18/095,784

(22) Filed: Jan. 11, 2023

(65) Prior Publication Data

US 2024/0235353 A1 Jul. 11, 2024

(51) Int. Cl.
*H02K 21/24* (2006.01)
*H02K 1/18* (2006.01)
*H02K 1/2793* (2022.01)
*H02K 1/2798* (2022.01)
*H02K 3/47* (2006.01)
(Continued)

(52) U.S. Cl.
CPC ........... *H02K 21/24* (2013.01); *H02K 1/2793* (2013.01); *H02K 1/2798* (2022.01); *H02K 16/02* (2013.01);
(Continued)

(58) Field of Classification Search
CPC ............ H02K 3/47; H02K 3/34; H02K 1/182; H02K 1/2798; H02K 15/0464; H02K 3/28
(Continued)

(56) References Cited

U.S. PATENT DOCUMENTS 3,790,835 A * 2/1974 Takeda ...................... H02K 3/00
310/237
4,484,097 A * 11/1984 Kanayama ............... H02K 3/26
310/201
(Continued)

FOREIGN PATENT DOCUMENTS

| CN | 105305749 A | * | 2/2016 | ............... H02K 1/27 |
| CN | 113517775 A | * | 10/2021 | ............... H02K 3/04 |
| DE | 102020126068 A1 | * | 4/2022 | ............. H02K 16/04 |

OTHER PUBLICATIONS

Translation of DE 102020126068 A1 (Year: 2022).*
Translation of CN 113517775 A (Year: 2021).*
Translation of CN 105305749 A (Year: 2016).*

*Primary Examiner* — Oluseye Iwarere
*Assistant Examiner* — Daniel K Schlak
(74) *Attorney, Agent, or Firm* — Fasken Martineau DuMoulin LLP; Dennis R. Haszko

(57) ABSTRACT

An axial flux electrical machine has a permanent magnet rotor fixedly mounted on a rotating shaft and at least one stator having a plurality of polyphase windings disposed along a common axis with the shaft. An insulation layer is fixed between the polyphase windings. In a first example, the mechanical angle and electrical angle of each of the two polyphase windings is aligned. In a second example, the mechanical and electrical angle of each of the two polyphase windings is offset. A controller and at least one sensor are incorporated with the axial flux electrical machine for fault detection in each of the polyphase windings. Upon detection of a fault in one of the polyphase windings, the controller is configured to disable that polyphase winding allowing the electrical machine to operate with the remaining polyphase winding.

20 Claims, 19 Drawing Sheets

(51) Int. Cl.
*H02K 16/02* (2006.01)
*H02K 3/34* (2006.01)

(52) U.S. Cl.
CPC ............... *H02K 1/182* (2013.01); *H02K 3/34* (2013.01); *H02K 3/47* (2013.01)

(58) Field of Classification Search
USPC .......................................... 336/205; 310/114
See application file for complete search history.

(56) References Cited

U.S. PATENT DOCUMENTS

| | | | | |
|---|---|---|---|---|
| 2003/0052553 | A1* | 3/2003 | Isozaki | H02K 37/125 310/156.36 |
| 2008/0100151 | A1* | 5/2008 | Takeuchi | H02K 21/04 310/156.01 |
| 2009/0096310 | A1* | 4/2009 | Takeuchi | H02K 11/215 310/156.36 |
| 2012/0126927 | A1* | 5/2012 | Iwaya | H01F 5/003 336/200 |
| 2013/0076192 | A1* | 3/2013 | Tanimoto | H02K 3/26 310/208 |
| 2016/0336824 | A1* | 11/2016 | Duan | H02K 21/24 |
| 2016/0365755 | A1* | 12/2016 | Long | H02K 15/0433 |
| 2017/0302217 | A1* | 10/2017 | Shinomoto | H02P 27/06 |
| 2020/0227991 | A1* | 7/2020 | Boettcher | H02K 3/28 |
| 2021/0044239 | A1* | 2/2021 | McLean | H02P 29/02 |
| 2021/0351652 | A1* | 11/2021 | Yu | H02K 3/04 |
| 2022/0255482 | A1* | 8/2022 | Jevremovic | H02P 29/028 |
| 2023/0052856 | A1* | 2/2023 | Chiang | H02K 1/27 |
| 2025/0047183 | A1* | 2/2025 | Lee | H02K 21/24 |

* cited by examiner

FAULT-TOLERANT AXIAL-GAP PERMANENT-MAGNET ELECTRIC MACHINE

BACKGROUND

Field of the Invention

The present invention generally relates to electrical machines. More specifically, the present invention relates to brushless axial-gap permanent-magnet (PM) electric machines employing a rotor having Halbach arrays and an ironless stator structure with stacked polyphase stator windings having an intermediate insulation layer between adjacent polyphase windings.

Related Art

Axial-gap permanent-magnet electric machines are known in the relevant arts for providing high power density and a relatively small, pancake-shaped volume making them well suited for applications where space is at a premium. One example of such applications is permanent magnet motor/generators used in electric and hybrid aircraft where grams of weight matter and space is fixed and limited. A subset of axial-gap permanent-magnet motors are those with ironless stators that provide increased efficiency due to the elimination of magnetic flux losses associated with hysteresis and eddy-currents in the iron stator cores allowing them to produce even more power from their already small volumes.

For example, U.S. Pat. No. 3,906,622 discloses methods of manufacturing ironless axial-gap stators involving self-bonding magnet wires and molding with epoxy resin. U.S. Pat. No. 5,744,896 discloses an ironless axial-gap stator that minimizes the magnetic gap and, thus, maximizes the magnetic flux through the stator windings. U.S. Pat. No. 7,157,826 describes windings useful in linear and rotary axial-gap permanent-magnet machines that are made from coils of conducting ribbons. U.S. Pat. No. 10,141,805 discloses yet another stator winding suitable for axial-gap permanent-magnet machines that is even more space-efficient.

Though effective at providing relatively small, energy dense axial-gap permanent-magnet electric machines there is still room for improvement in the art. This is especially true in applications such as aircraft, spacecraft, drones, or submersibles where the consequences of machine failure can be severe, even catastrophic. The present invention is directed towards those reliability needs.

SUMMARY OF THE INVENTION

The implementations disclosed herein provide an axial flux electrical machine having a permanent magnet rotor fixedly mounted on a rotating shaft and at least one stator having a plurality of polyphase windings disposed along a common axis with the shaft. An insulation layer is fixed between the polyphase windings. In a first example, the mechanical angle and electrical angle of each of the two polyphase windings is aligned. In a second example, the mechanical and electrical angle of each of the two polyphase windings is offset.

In an alternative implementation multiple stators each have two polyphase windings disposed along a common axis with the shaft with an insulation layer fixed between the two polyphase windings in each stator.

The implementations further incorporate a controller for fault detection in each of the polyphase windings. Upon detection of a fault in one of the polyphase windings, the controller is configured to disable that entire polyphase winding or disable a single phase conductor within the polyphase winding allowing the electrical machine to operate with the remaining functioning phases.

DETAILED DESCRIPTION

The example implementations described herein incorporate at least one stator with a plurality of stacked polyphase windings for an axial flux permanent magnet brushless electrical machine using a Halbach array of magnets in the rotor. The disclosed structure effectively eliminates phaseto-core shorts by the absence of an iron core and turn-to-turn shorts are eliminated by providing serpentine configuration of the conductors in the windings which prevents individual segments of the windings from being disposed adjacent to one another where direct shorts could occur. Further, phase-to-phase short between the polyphase windings are avoided by adding an insulation layer intermediate the stacked polyphase windings to isolate two polyphase subsets on the stator. In an exemplary implementation six phases are partitioned into two sets of three phases each. Each polyphase subset forming a winding layer with a generally planar structure stacked to define the stator structure. By providing appropriate fault isolation and control each of the winding layers and the associated phase subsets is capable of functioning as an independent polyphase electric machine. Thus, if one or more phases fails in one subset of polyphases, the electric machine will continue to function with the remaining polyphase subsets.

Figure 1:
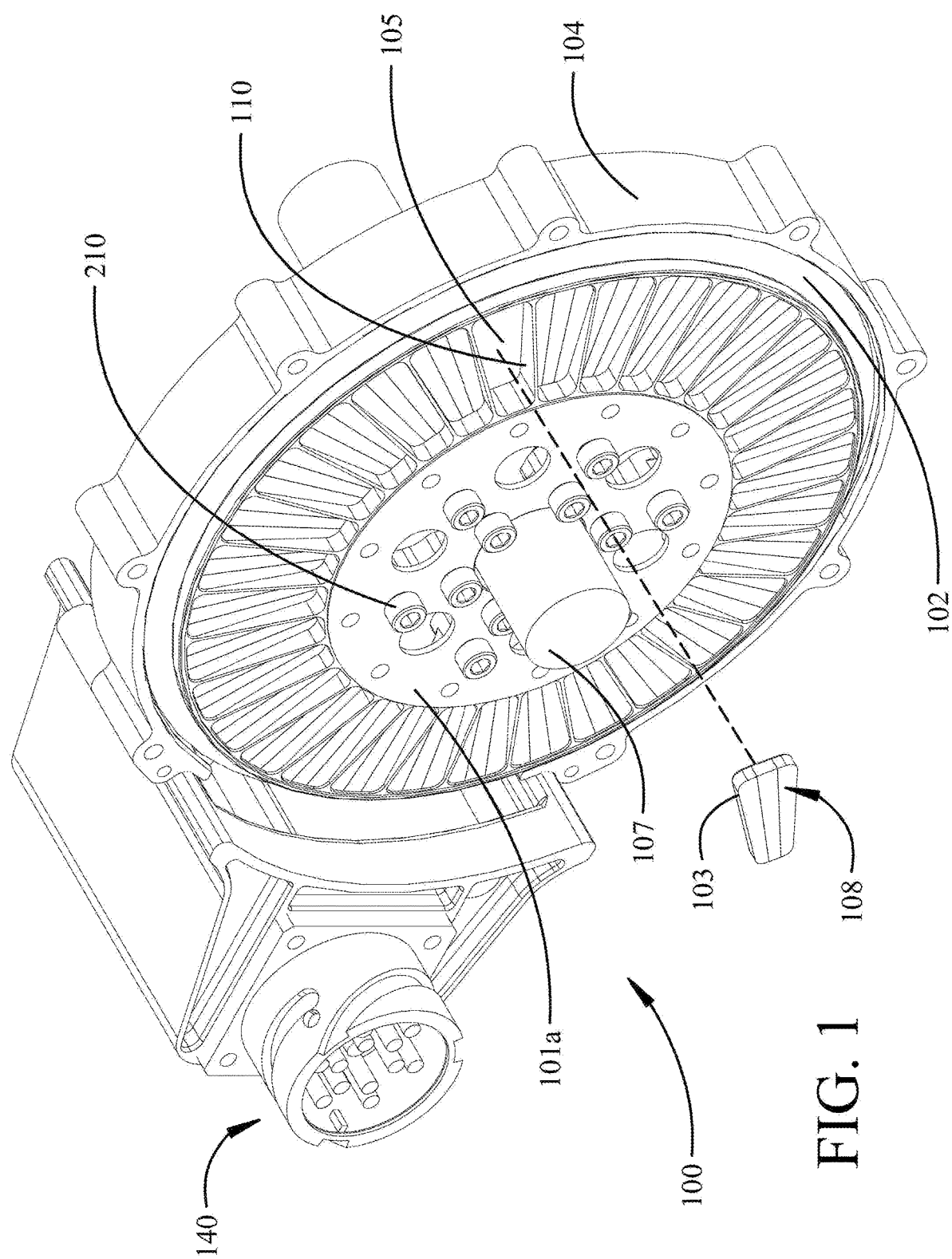
FIG. 1 is a perspective view of an exemplary implementation of a brushless axial-gap permanent-magnet (PM) electric machine having an ironless stator structure and Halbach array rotors.
Figure 2A:
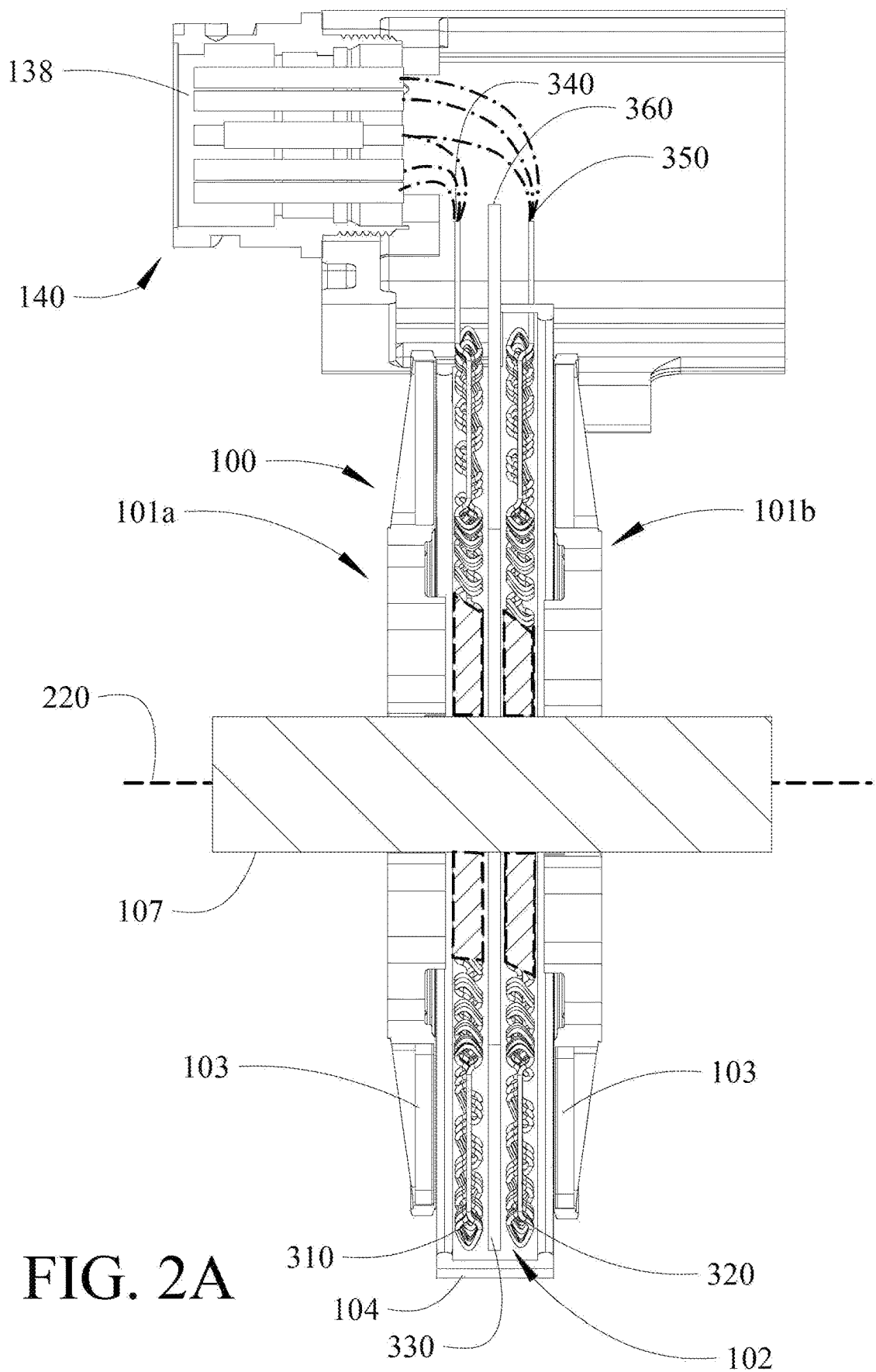
FIG. 2A is a cross-sectional view of an electrical machine of FIG. 1.

Referring now to the drawings wherein like reference numerals designate corresponding structure throughout the views, FIGS. 1 and 2A show an electrical machine 100 having a stator 102 held in a support structure 104. The stator phase windings are connected to a plurality of connector pins 138 in connector 140. A rotor 101 has a top rotor 101A which incorporates a plurality of pockets 105 having tapered side pocket walls 110 receiving magnet assemblies 103 and a rotor shaft mounting hole 107. The top rotor 101A is held concentric on a common axis 220 with the stator 102 by a rotor shaft 107. The number of Halbach array magnets per pocket can vary and the number per pocket shown in FIG. 1 is three. Each pocket corresponds to one magnetic pole, and, since there are two poles per cycle, there are six magnets per cycle and adjacent magnets differ in magnetization direction by 60 degrees. The groups of three magnets in each magnet assembly 103 are bonded together along bond lines 108, one of which is labeled as an example.

FIG. 2A shows a section view of the implementation of the electrical machine with the top rotor 101*a*, stator 102, support structure 104, and bottom rotor 101*b*. The structure of bottom rotor 101*b* is substantially a mirror image of the structure of the top rotor 101*a* described above. The windings 310 and 320 of the stator, shown in detail in FIGS. 3 and 4A, and rotor structure are expanded slightly in the directions along axis 220 for the sake of visualization and are truncated and shown in phantom for clarity. In practice, the windings are compressed and the magnetic gap is minimized for higher performance with minimized magnet size. Also shown are fastening screws 210 that connect the top and bottom rotors with one screw labeled. It is to be understood that the implementation shown represents a complete electrical machine including rotors, magnet retention devices, at least one stator, a housing, a shaft, and bearings. However, a frameless electrical machine solely having rotor plates and the stator also constitutes an implementation of the invention that may be incorporated into other machines that provide the bearings, shafts, and support structures.

Figure 3:
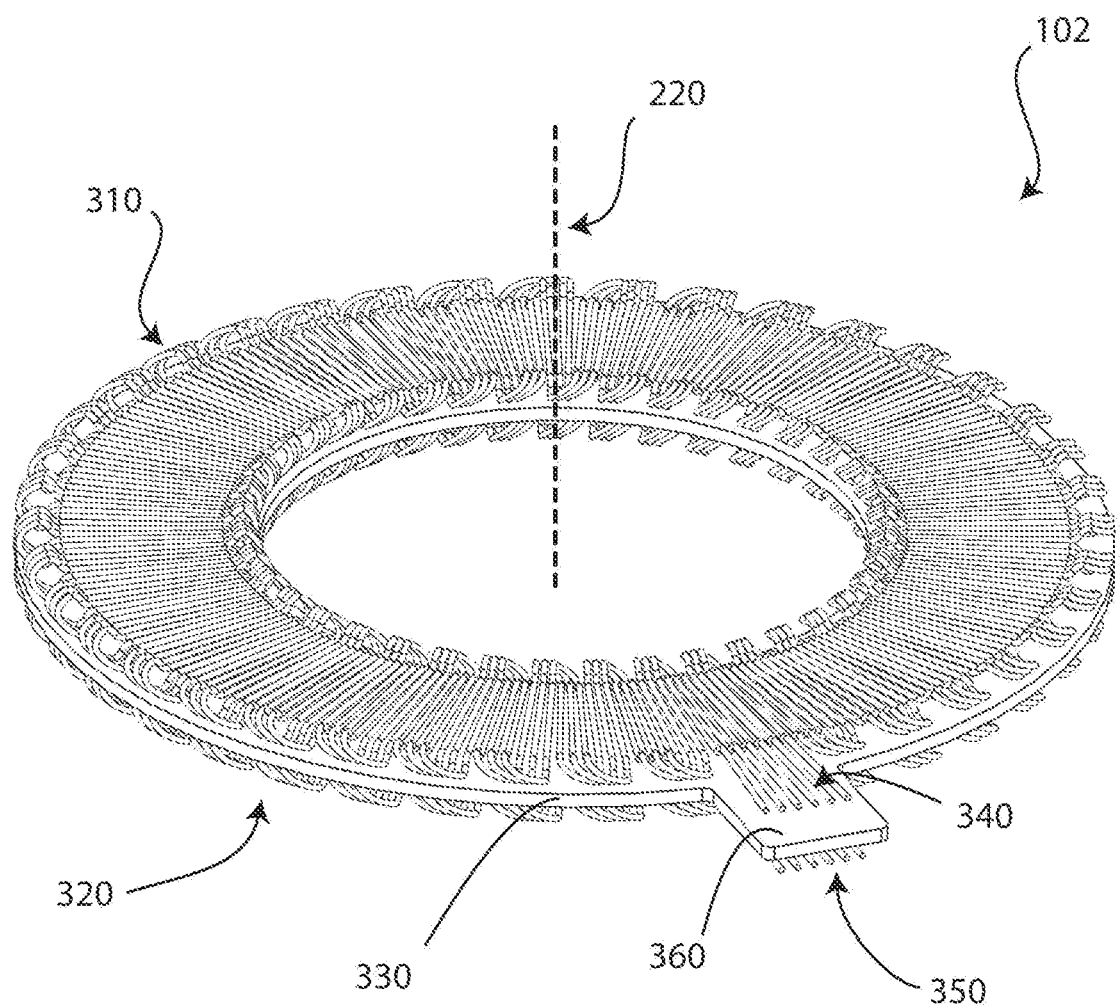
FIG. 3 is a perspective view of axial-gap motor stator illustrating isolated redundant windings.

FIG. 3 shows details of the stator 102 with top or first polyphase winding 310 and bottom or second polyphase winding 320. In the example implementation each polyphase winding has three phases although any integer number of phases greater than or equal to two is possible. The conductors for each phase in the polyphase windings are insulated. The insulation of the individual conductors also isolates the first polyphase winding from the second polyphase winding providing two separately operable polyphase windings. Additionally, an insulation layer 330 intermediate the first polyphase winding and second polyphase winding provides redundant protection from phase shorts between the two polyphase windings. The insulation layer provides space and weight efficient failure protection redundancy due to the planar structure of the two polyphase windings. The polyphase windings 310 and 320 are connected for power extraction and control through first phase leads 340 and second phase leads 350 radially extending from the winding for connection to connector 140 (connections from the leads to the pins 138 are represented in phantom for overall clarity) An insulation tab 360 extends from the insulation layer 330 intermediate the first phase leads and second phase leads. The axis 220 defines the center of curvature for circular and arcuate elements of the stator.

The stator structure in the example implementation of FIG. 3 is formed into a pressed rigid structure by over molding with epoxy resin or other polymer resin. As previously described, the inner and outer end-turns of the conductors in windings are shown expanded in the directions along axis 220 for the sake of visualization. Once pressed, the end-turns are compact along the directions of 220. For stranded or litz wire conductors, self-bonding wire can be used and thermally set via heating and then over molded as described in U.S. Pat. No. 3,906,622. The resulting structure can be bonded into the support structure 104 or the over molding process and bonding into the support structure 104 can be accomplished in a single step.

Figure 4A:
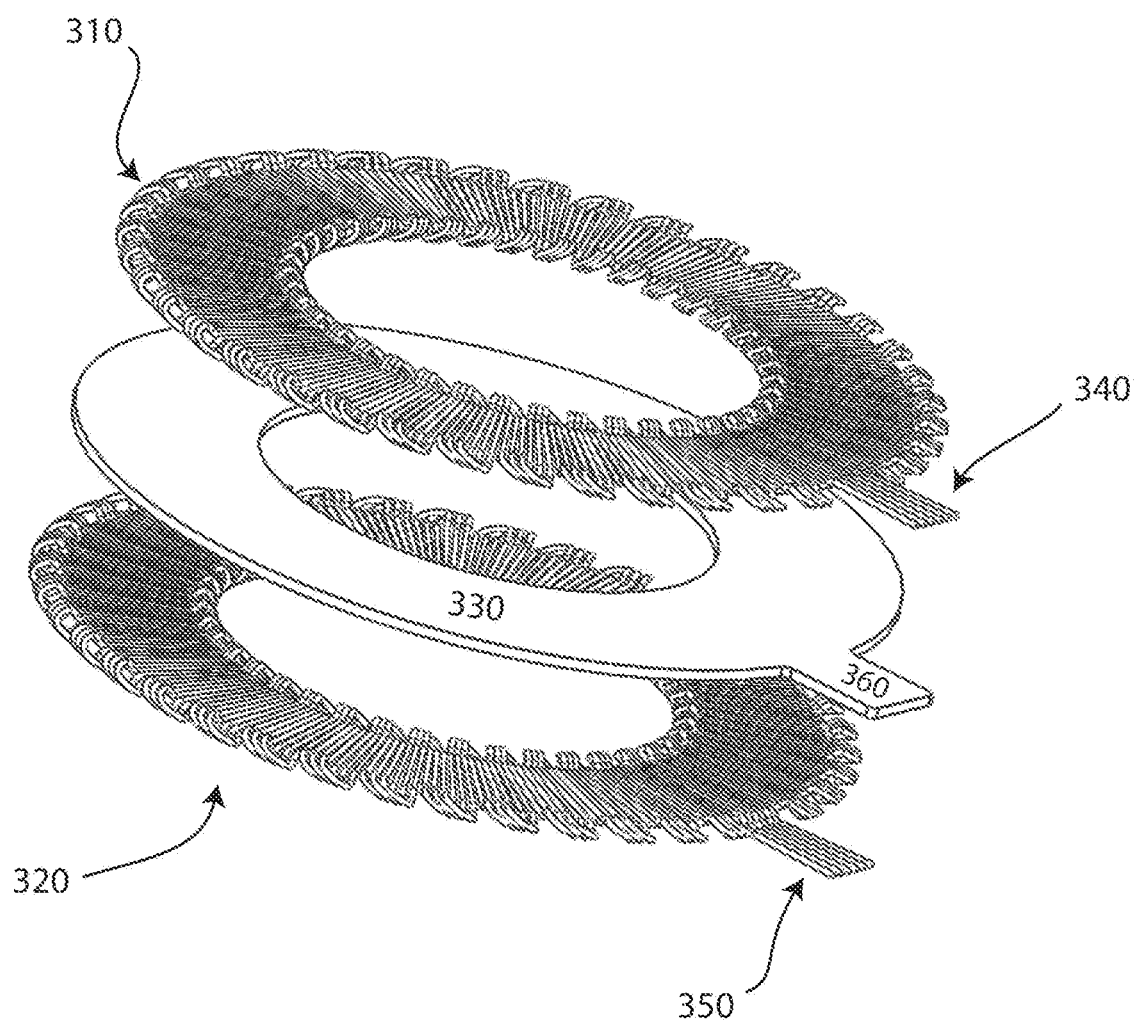
FIG. 4A is an exploded view of axial-gap motor stator of FIG. 3 showing the intermediate insulation layer.

FIG. 4A shows an exploded view of the stator assembly of FIG. 3. The material of the insulation layer 330 is preferably a insulating polymer or polymer composite capable of providing electrical insulation, durability at elevated temperatures, and mechanical strength. Preferable materials are polyimide (e.g. DuPont Kapton), with typical thicknesses of 0.002", 0.005", 0.010", or 0.020". A polymer composite such as fiberglass reinforced epoxy laminate (e.g. FR4 circuit board material) is also a good option and is particularly suitable for providing mechanical strength. Typical thicknesses of FR4 are 0.015", 0.020", and 0.025".

In certain implementations, the insulation layer 330 may also be a carbon fiber composite structure to provide the desired rigidity. While carbon fiber may be a conductor, selection of a suitable matrix material to provide the desired insulation may allow additional benefits from the carbon fiber to be realized including acting as a partially conductive sheet/layer to allow electrostatic charge to be drained off of the surface of the stator or provide higher thermal conduction to allow cooling of the stator windings.

Figure 4B:
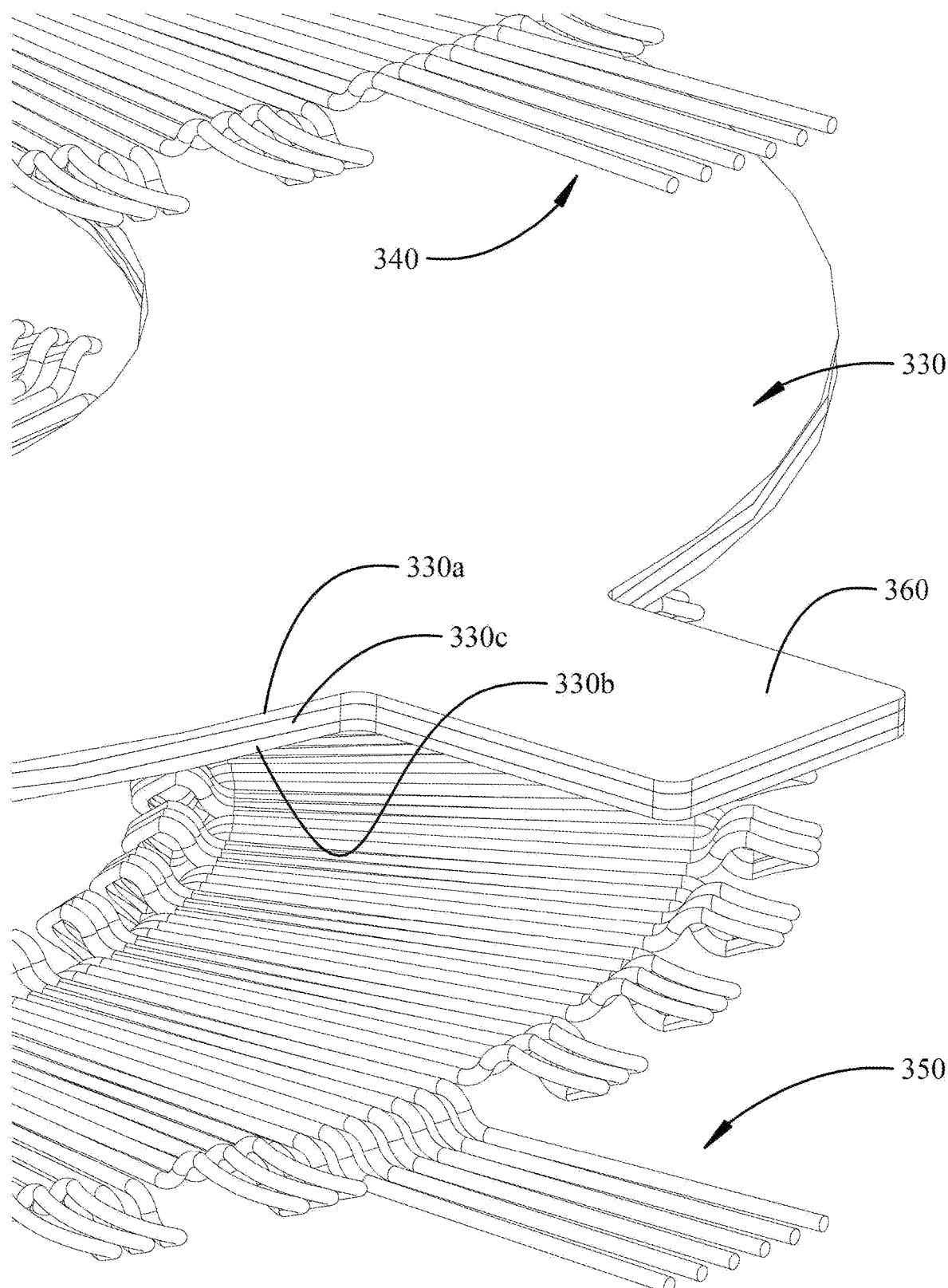
FIG. 4B is an enlarged view of a portion of the axial gap motor stator showing a multilayer structure of the insulation layer.

As shown in FIG. 4B, the insulation layer may also be constructed as a multilayer composite with external layers 330*a* and 330*b* employing high dielectric materials for electrical insulation between the windings 310, 320 with a central layer 330*c* of carbon fiber composite for greater rigidity.

Figure 5:
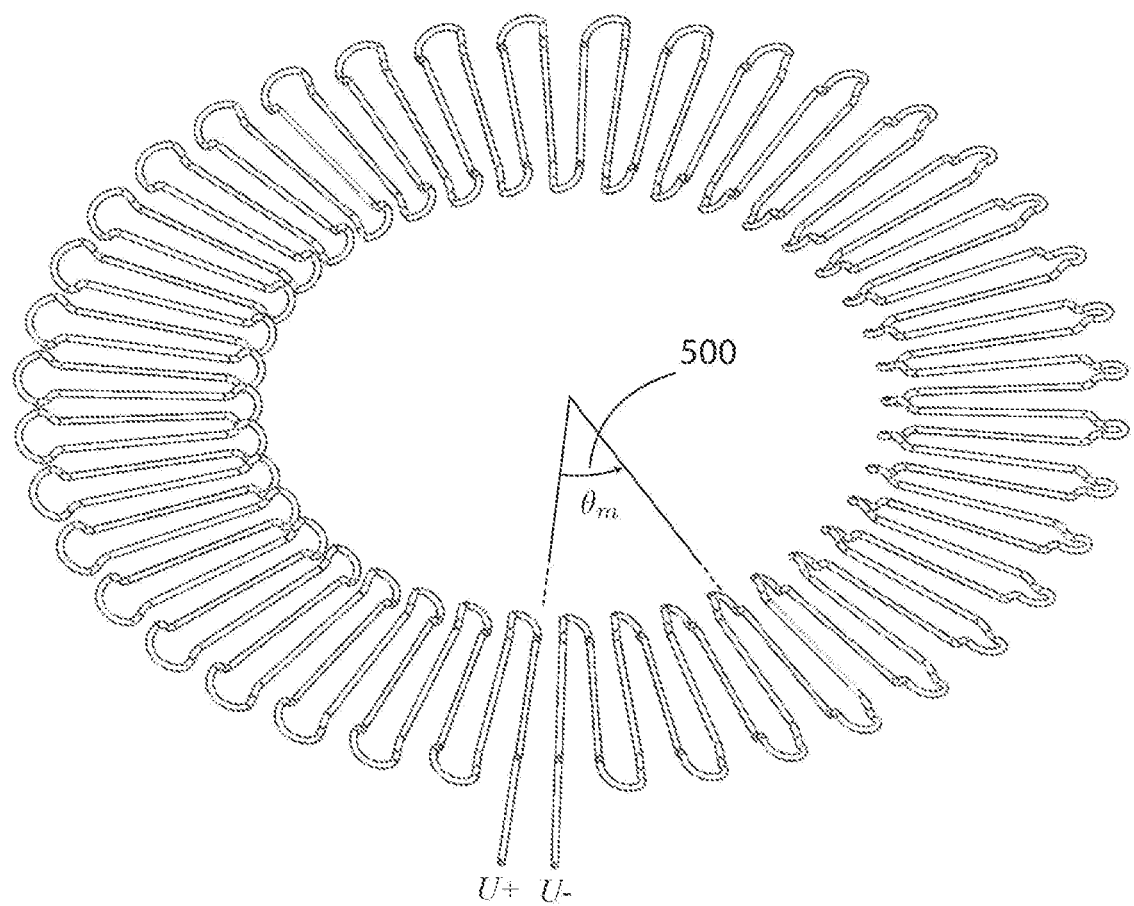
FIG. 5 is a perspective view of an exemplary serpentine phase conductor of a motor stator.

FIG. 5 shows the serpentine structure of the conductor providing phase U having terminals U+ and U−. All the phase conductors in the first polyphase winding 310 have the same structure and are offset circumferentially so that they nest together. The second polyphase winding has the same structure. The serpentine structure provides consistent and continuous spacing of segments of a single-phase wire thereby avoiding self-shorting. Phase-to-phase shorts are isolated using fuses or electronic switches as will be described subsequently. Also depicted in FIG. 5 is the mechanical angle $\theta_m$ 500 used in specifying the location of conductor segments, end-turns, and other motor components.

Figure 6:
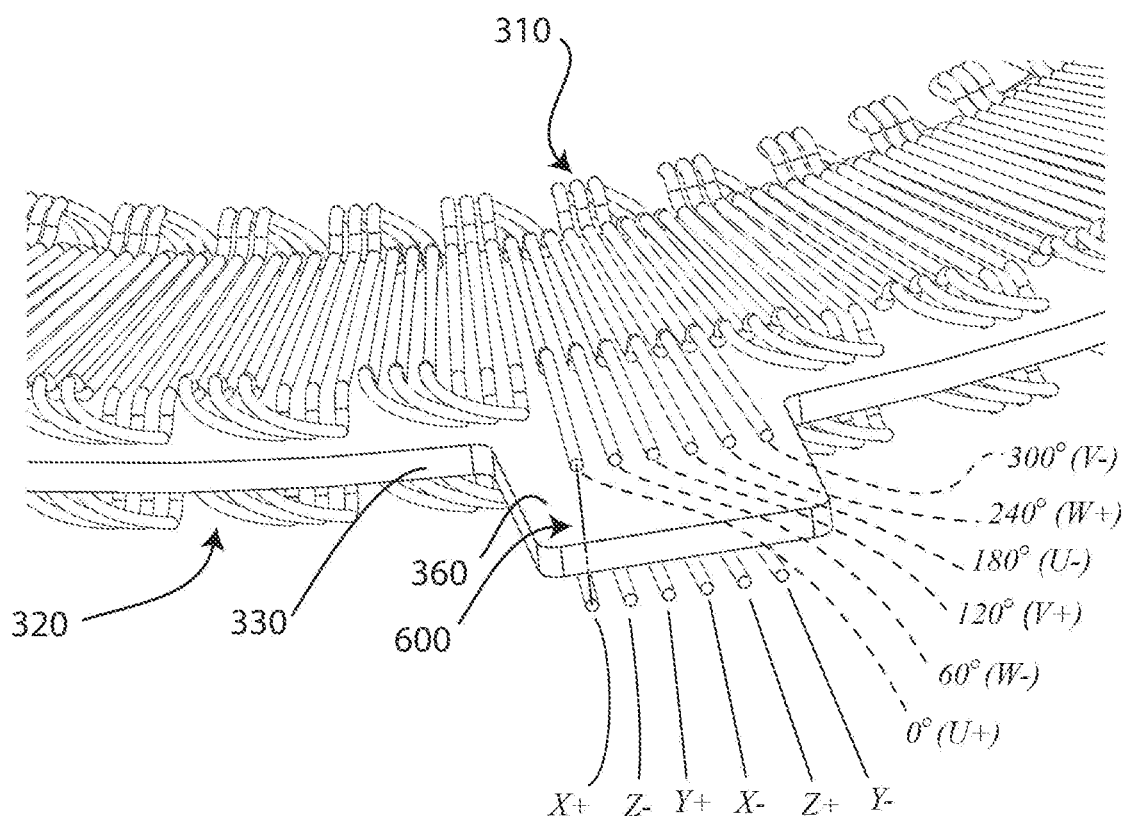
FIG. 6 is a partial expanded view of the axial-gap motor stator of FIG. 3 illustrating winding leads and respective terminals for an implementation where the isolated redundant winding phase sets have the same electrical angles.

FIG. 6 depicts, for the example implementation, the relative mechanical angle of the first phase leads and second phase leads and a zero-angle reference line 600 for a line extending from the axis of symmetry 200 (see FIG. 3) to line 600. The leads are shown extending radially from the windings so that their mechanical angle indicates their electrical angle as well. If the motor has Np poles, there are Np/2 magnetic cycles in one revolution of the motor, and electrical angle of a single-phase terminal is related to its mechanical angle $\theta_m$ by $\theta_t=(N_p/2)\theta_m$ (modulo 360°). The phase voltage for phase U is measured across terminals U+ and U− and similarly for phases V, W and X, Y, Z. Note that the electrical angle of U− is 180 degrees from U+ as expected. Further, for the phase terminal geometry shown, the electrical angles of U, V, and W are the same as X, Y, and Z respectively. By having matching electrical phase angles, it is possible to simplify some aspects of the motor control.

Figure 7:
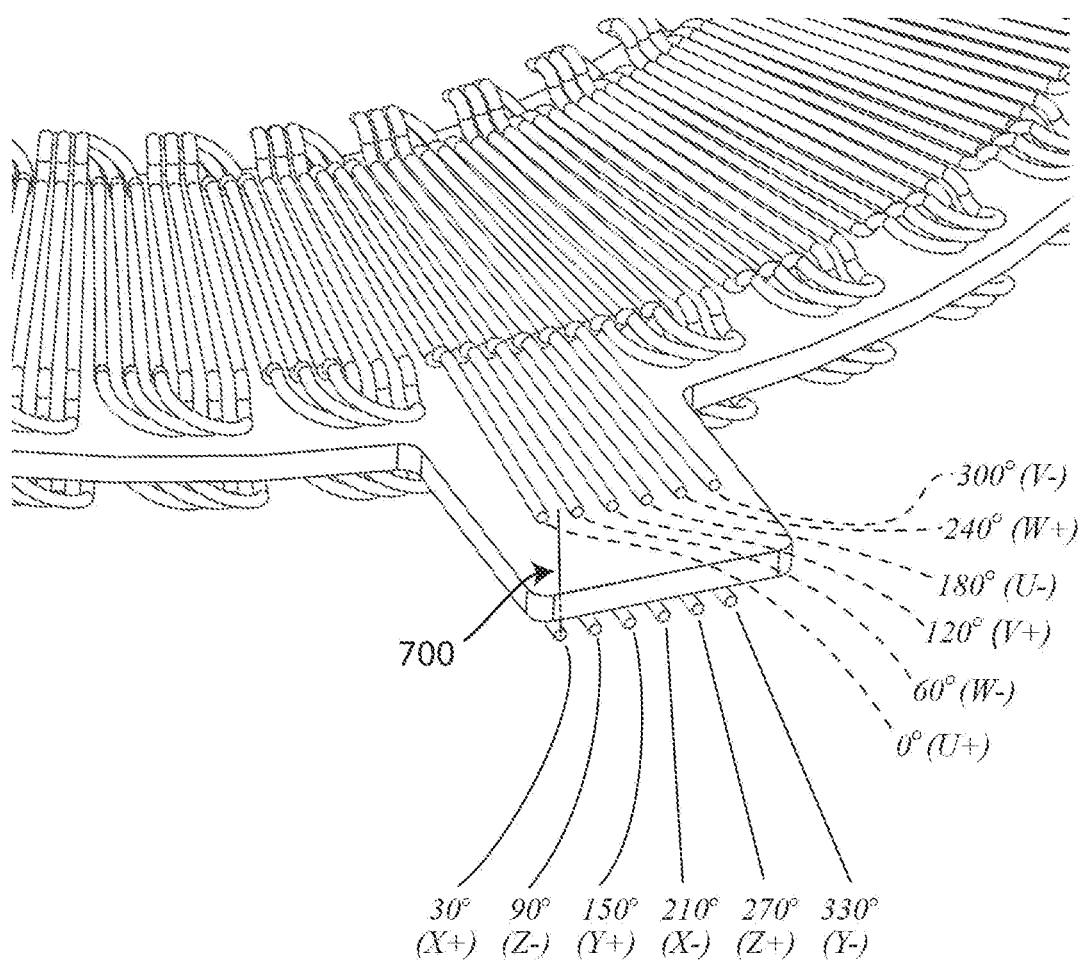
FIG. 7 is a partial expanded view of the axial-gap motor stator of FIG. 3 illustrating winding leads and respective terminals for an implementation where the isolated redundant winding phases have interleaved electrical angles.

In an alternative implementation shown in FIG. 7, phase leads for phases X, Y, and Z are shifted 30 electrical degrees relative to their electrical angles in FIG. 6. Reference line 700 is positioned at 30-degrees electrical angle. This phasing is referred to herein as "interleaved phasing." Interleaved phasing generally provides for reduced torque ripple and smoother operation of the motor when both windings are functional.

Figure 2B:
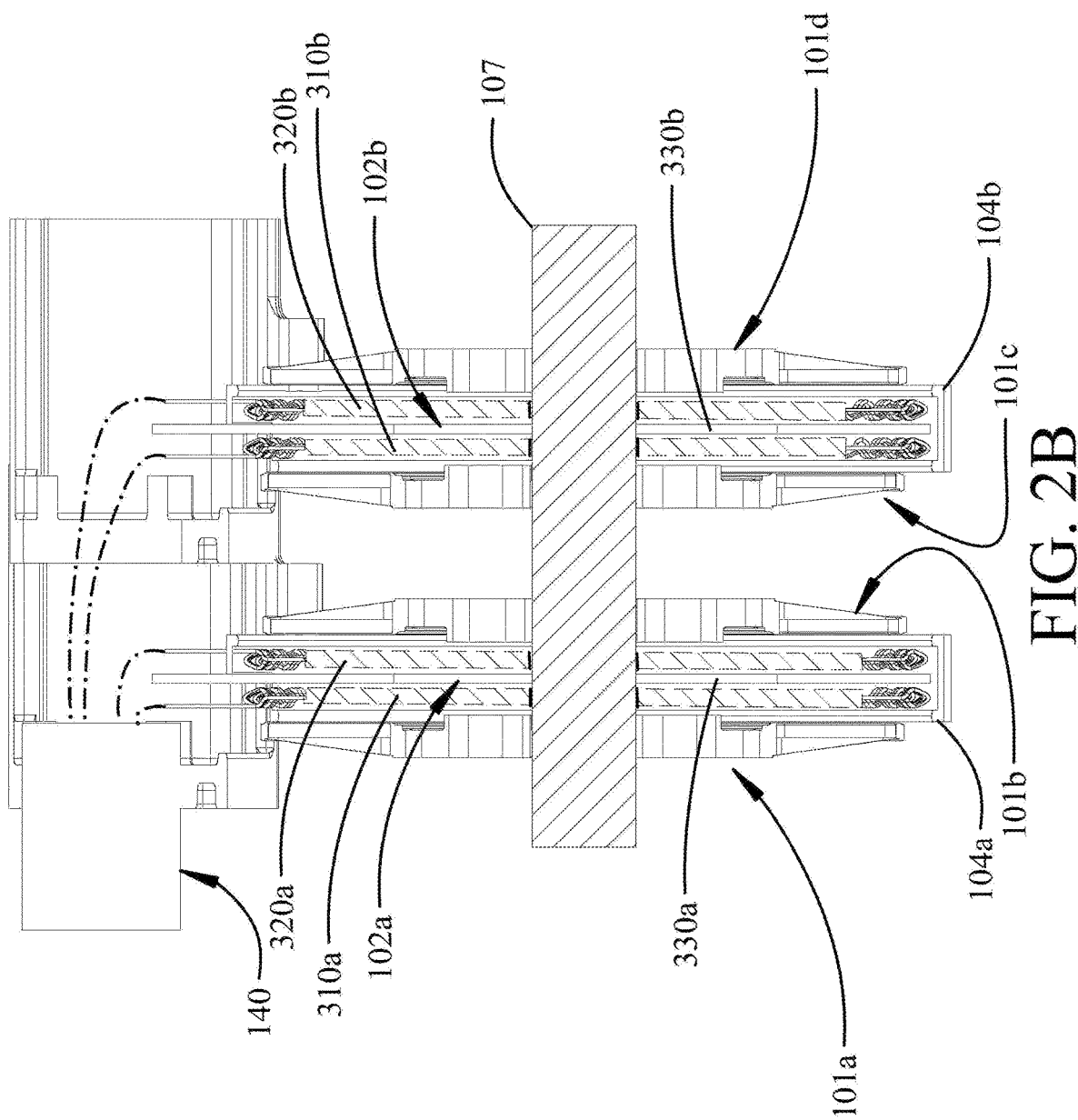
FIG. 2B is a cross-sectional view of a two stator implementation with stacked polyphase windings in each stator.

An alternative implementation of the electrical machine with multiple stators is shown in FIG. 2B where each stator, 102a and 102b, employs stacked polyphase windings 310a, 310 b and 320a, 320b (shown truncated and in phantom as in FIG. 2A) having a structure as previously described with respect to FIGS. 3 and 4 with insulation layers 330a and 330b. The windings are shown are expanded slightly in the directions along axis 220 as in FIG. 2A for the sake of visualization and are truncated and shown in phantom for clarity Each stator 102a, 102b may have the polyphase windings oriented in an aligned or interleaved mechanical and electrical configuration as shown in FIGS. 6 and 7. Rotors 101a and 101b are associated with stator 102a and a second rotor set 101c and 101d are associated with stator 102b.

Figure 8:
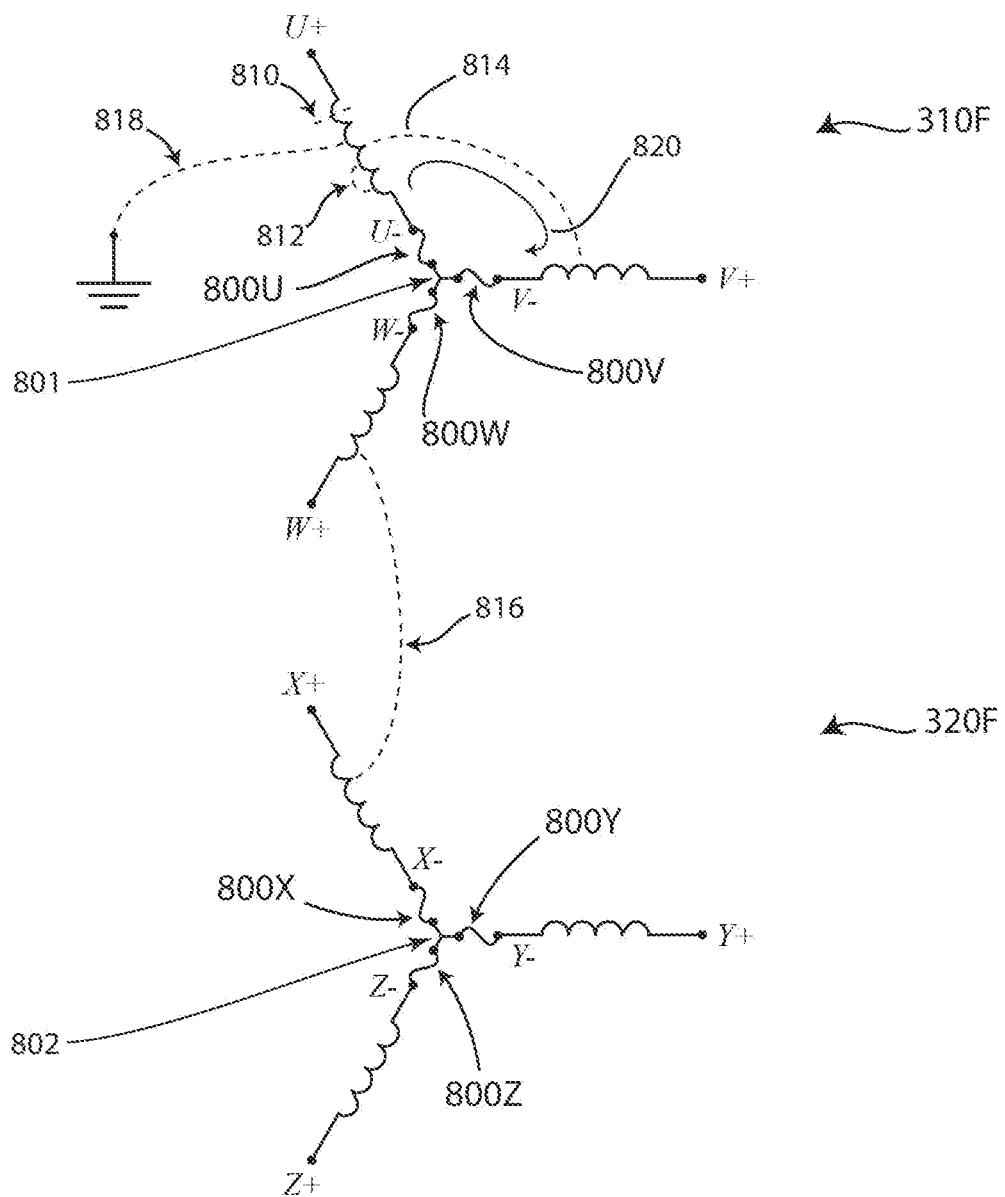
FIG. 8 is a circuit diagram showing independent fused wye connections of the two windings isolating the redundant winding phases.

For the stators in the implementations described, the first and second polyphase windings may be employed in a fused wye configuration designated as 310F and 320F as shown schematically in FIG. 8. Fuses 800U, 800V, and 800W connect the corresponding phase to the wye-point 801. Similarly, fuses 800X, 800Y, and 800Z connect the corresponding phases to the wye-point 802. Also depicted are failure modes 818 (short to ground), and 810 (open circuit). With the configuration of the present stacked polyphase windings, phase-to-phase short 816 between phases in the first and second polyphase windings is prevented by redundant insulation layer 330 and insulation tab 360. Phase to phase shorts 814 cause adjacent fuses to blow, faults are detected by the controller, and the entire failed polyphase winding is disconnected. Turn to turn shorts 812 within the polyphase winding are prevented by the serpentine configuration of the windings. For the fused configuration of FIG. 8, power electronics, described subsequently, are required to drive U+, V+, W+, X+, Y+, and Z+. In a condition of a short to ground or an open circuit in any phase of one polyphase winding continued operation of the motor may be accomplished by disconnecting that polyphase winding.

Figure 9:
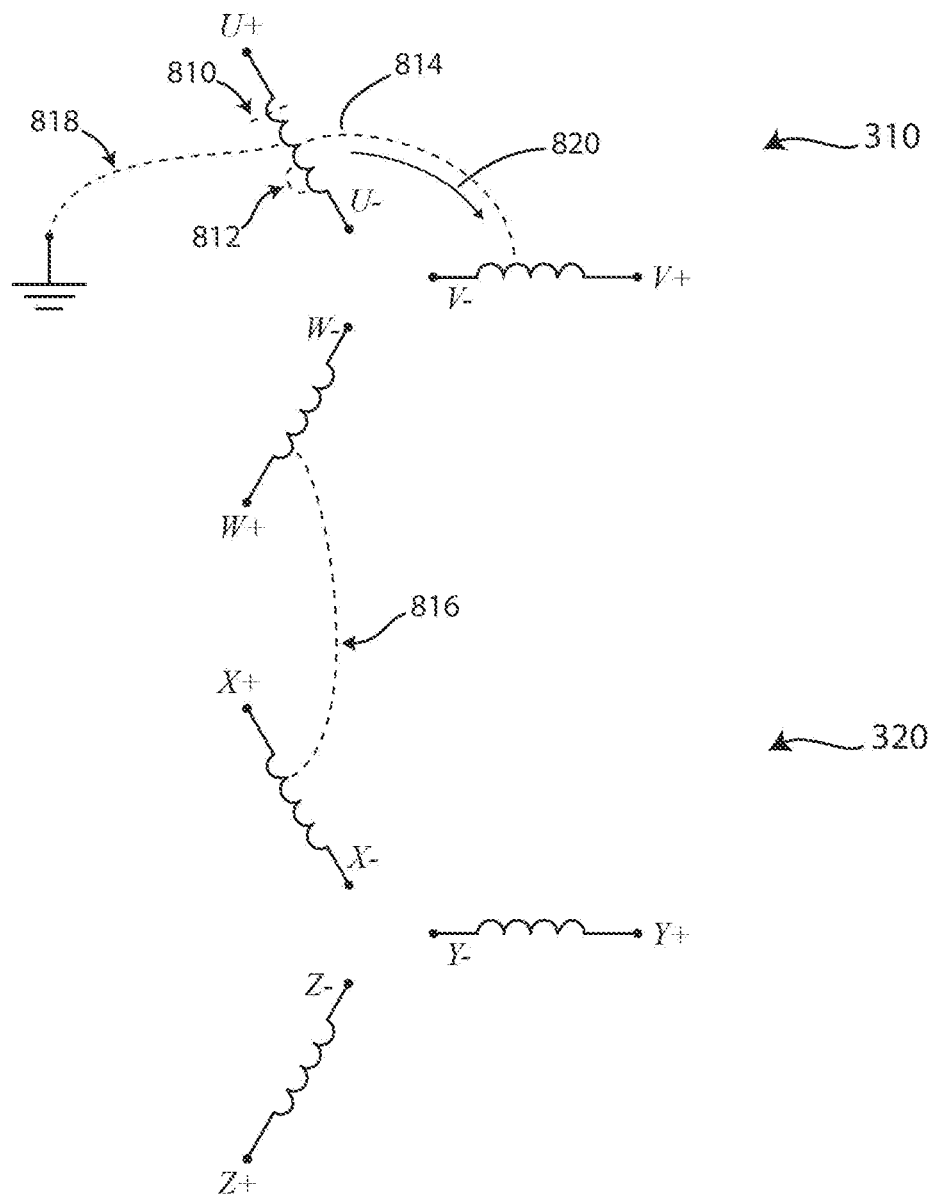
FIG. 9 is a circuit diagram showing phase connector connection wherein each terminal is independently controlled.

FIG. 9 is a schematic diagram of the first polyphase winding 310 and second polyphase winding 320 without fusing. In this configuration there are twelve terminals that are driven by power electronics: U+, U−, V+, V−, W+, W−, X+, X−, Y+, Y−, Z+, Z−. This configuration allows for independent control of each phase conductor. Failure modes are also indicated. Again, with the configuration of the present stacked polyphase windings, phase-to-phase short 816 between phases in the first and second polyphase windings is prevented by redundant insulation layer 330 and insulation tab 360. Phase to phase short 814 is detected and isolated electronically with the controller. Turn to turn shorts 812 within each polyphase winding are prevented by the serpentine configuration of the windings. In a condition of a short to ground or an open circuit in any phase conductor of one polyphase winding continued operation of the motor may be accomplished by disconnecting that polyphase winding or any affected phase conductors.

Figure 10:
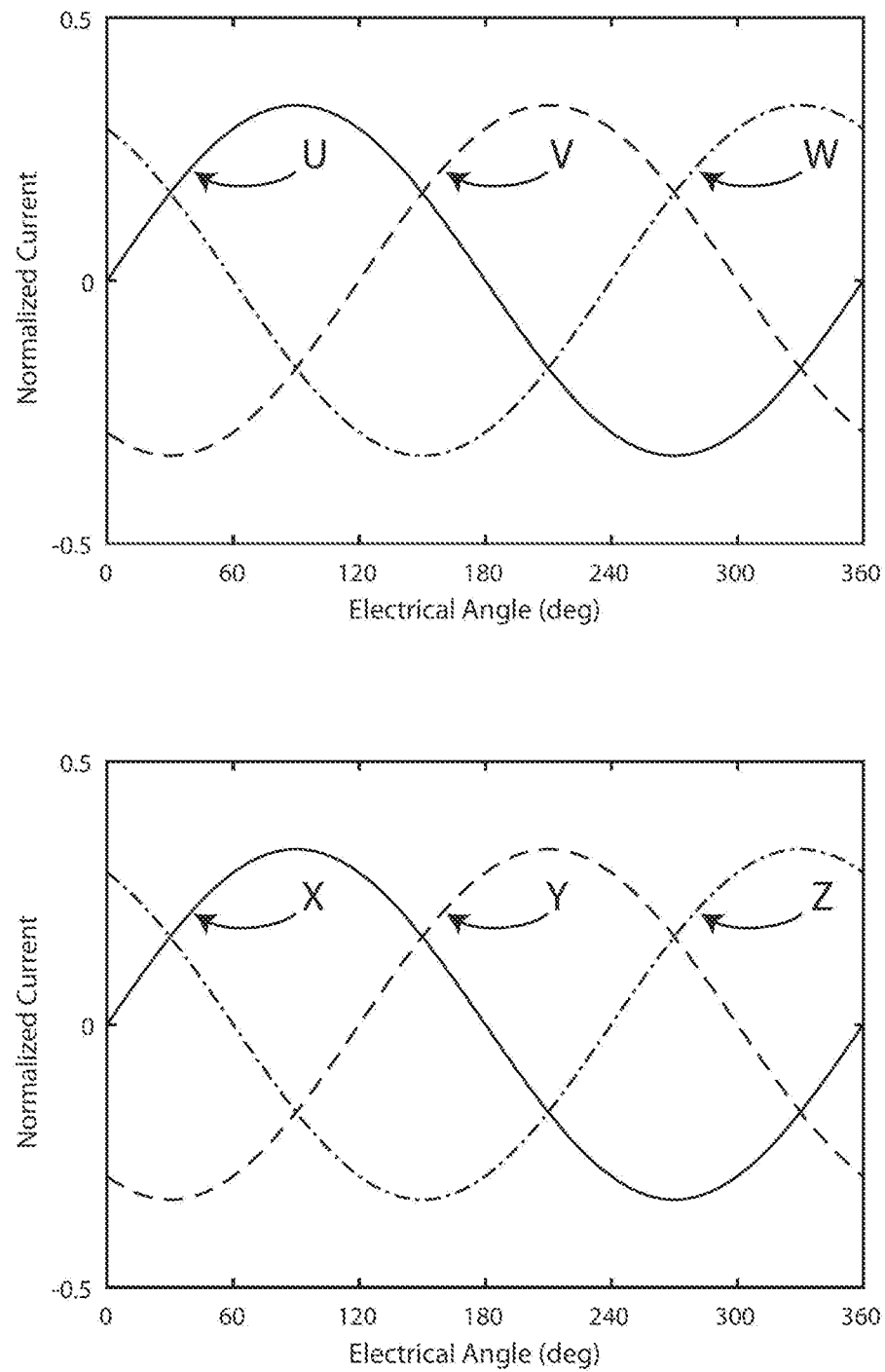
FIG. 10 shows normalized current waveforms for the 6 phases of the stacked polyphase stator in the case where the phase sets have the same electrical angles as illustrated in FIG. 6.

FIG. 10 shows normalized current waveforms for the alignment of FIG. 6. The normalized current for the upper winding in the upper plot is aligned with normalized current waveforms for the lower winding in the lower plot. The horizontal axes of the two plots are the same and aligned. These waveforms are scaled to produce varying levels of torque and are shown as sinusoidal as commonly used with motors having sinusoidal gap fluxes.

Figure 11:
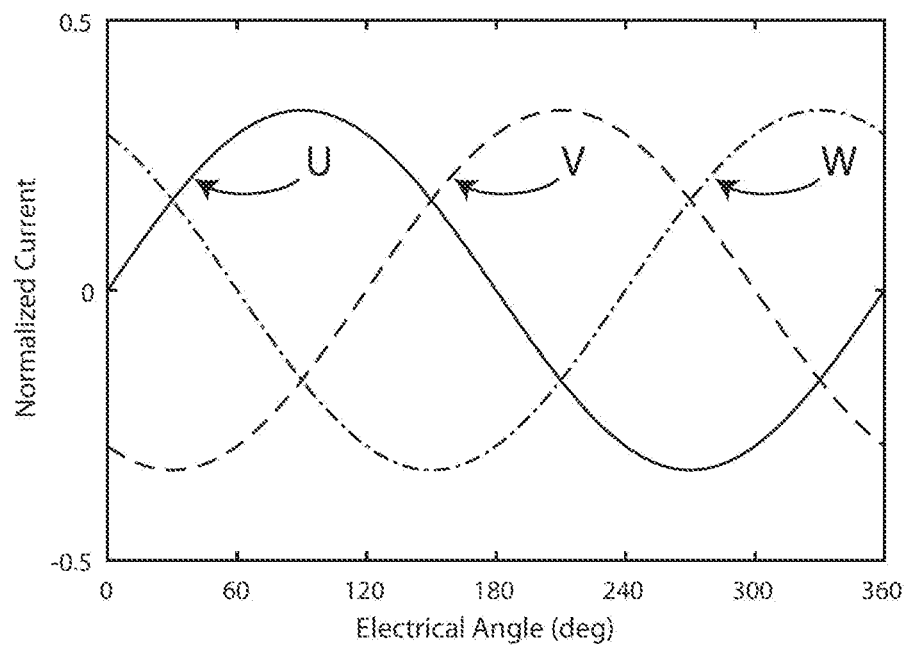
FIG. 11 shows normalized current waveforms for the 6 phases in the case where the phase sets have the interleaved electrical angles as illustrated in FIG. 7.
Figure 11:
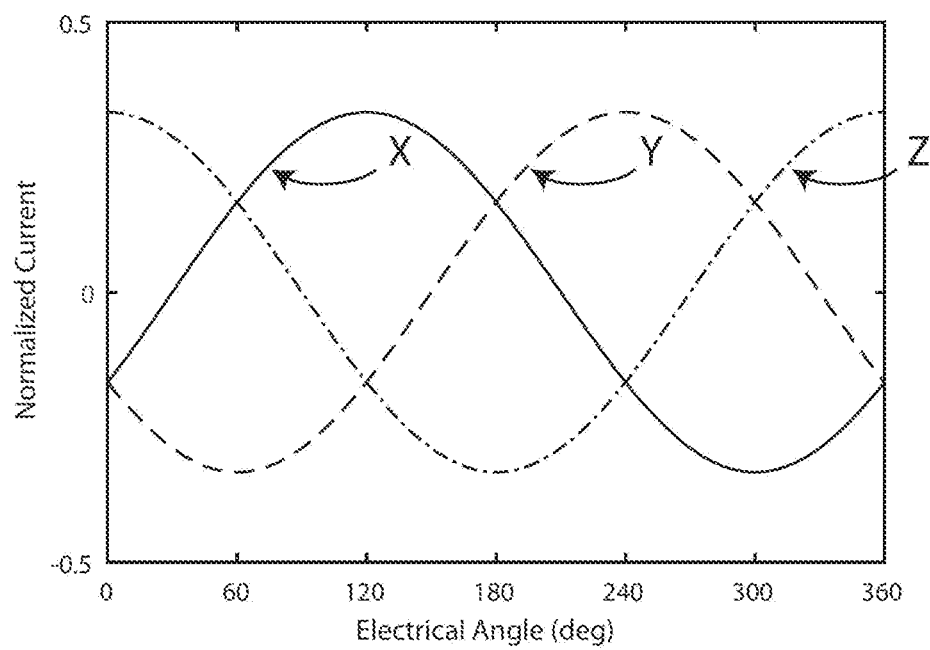

FIG. 11 shows normalized current waveforms for the alignment of FIG. 7 where the upper and lower windings are shifted 30 degrees relative to each other. The normalized current for the upper winding in the upper plot and, shifted to the right be 30 degrees, is the normalized current waveforms for the lower winding in the lower plot. The horizontal axes of the two plots are the same and aligned. These waveforms are scaled to produce varying levels of torque.

Figure 12:
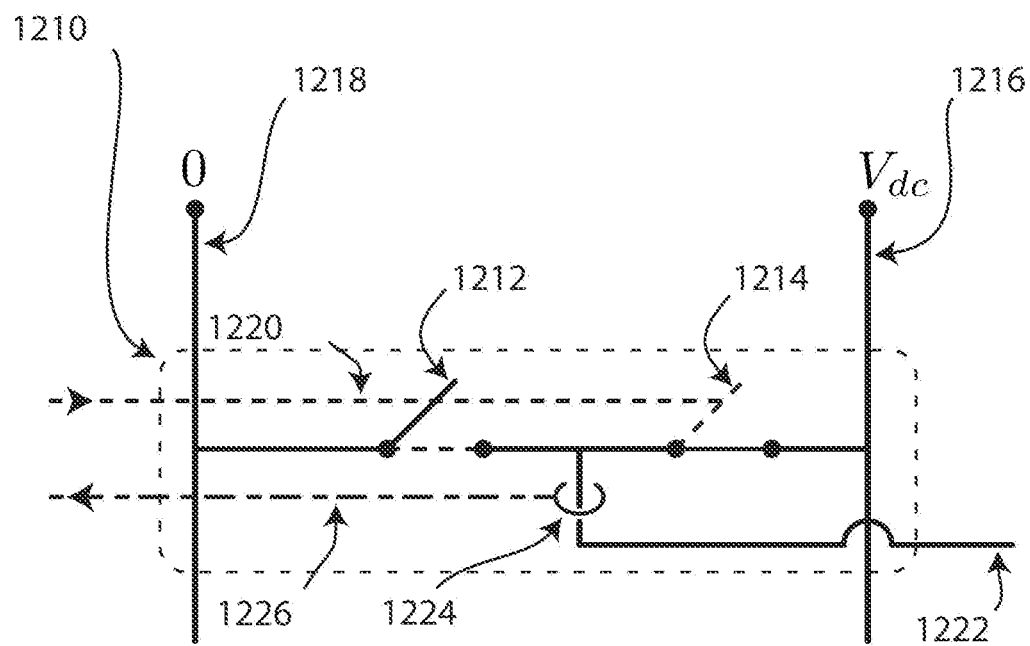
FIG. 12 is a circuit diagram of a power electronics half-bridge for controlling the phase terminal U+.

FIG. 12 demonstrates an example transistor switch half-bridge for driving each of the phase terminals in the polyphase windings. The transistor switches 1212 and 1214 are typically metal-oxide semiconductor (MOS) type switches or bipolar junction transistor (BJT) type switches. The switches incorporate gate drive (for MOS transistors) or other drive circuitry that responds to a logical input. The switches are connected to a power bus 1216 at voltage Vdc, to a ground bus 1218 at 0 voltage, and to the output feeder 1222 to a phase conductor terminal of the motor. The switches are controlled with state signal 1220 which is at a logical 1 to indicate that 1214 is closed and 1212 is open. Signal 1220 is at a logical 0 state to indicate the opposite condition where 1214 is open and 1212 is closed. The switching is never perfect due to parasitic delays and the drive circuits are timed by a controller, as described subsequently, to ensure that both switches are not closed at the same time. Such timing adjustments are typically a few nanoseconds. Also shown are current sensor 1224 and current sense signal 1226 used for feedback control of the phase current and fault detection.

Figure 13:
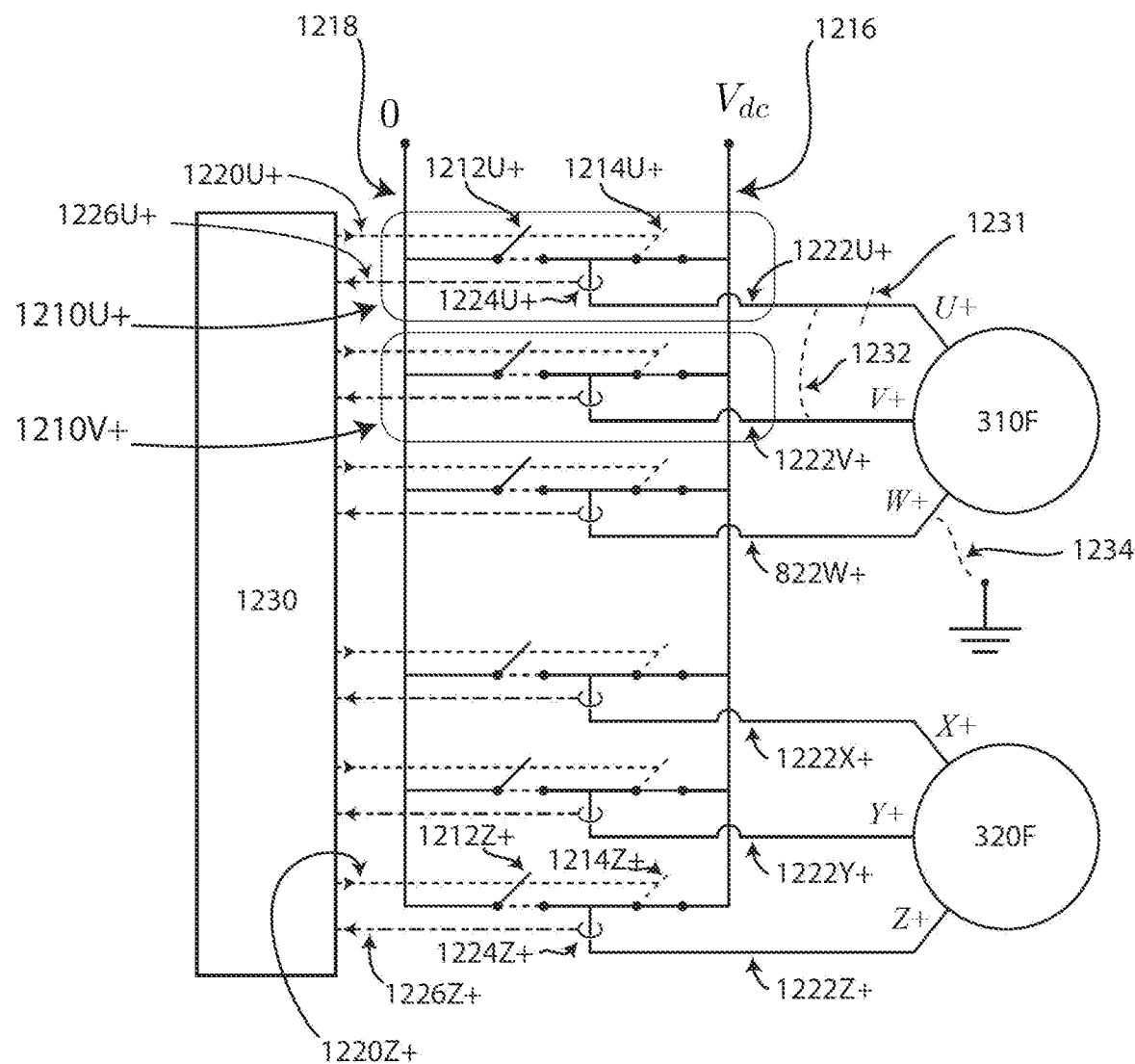
FIG. 13 is a circuit diagram of a power electronics systems for controlling the motor having independent fused wye connections as in FIG. 8.

A motor control system for the fused connection of FIG. 8 is shown in FIG. 13 with six half bridges as depicted in FIG. 12. Suffixes U+, V+, W+, X+, Y+ and Z+ on the element numbers define the bridge elements with the associated phase winding. A controller 1230 controls the half bridges 1210U+, 1210V+, 1210W+, 1210X+, 1210Y+ and 1210Z+ with state signals 1220U+, 1220 V+, 1220W+, 1220X+, 1220Y+ and 1220Z+ and senses the individual terminal currents with input to the controller 1230 by signal lines 1226U+, 1226V+, 1226W+, 1226X+, 1226Y+ and 1226Z+ from current sensors 1224U+, 1224V+, 1224W+, 1114X+, 1224Y+ and 1224Z+, The additional failure modes 1231 (feeder open), 1232 (feeder-to-feeder short), and 1234 (feeder-to-ground) are shown, which will also be detected by the current sensors 1224. For the alternative implementation of FIG. 2B, control of each of the stators 102a and 102b employs a circuit as identified in FIG. 13 (however, a single controller 1230 may be employed for control of the two winding bridges for each stator.

Figure 14A:
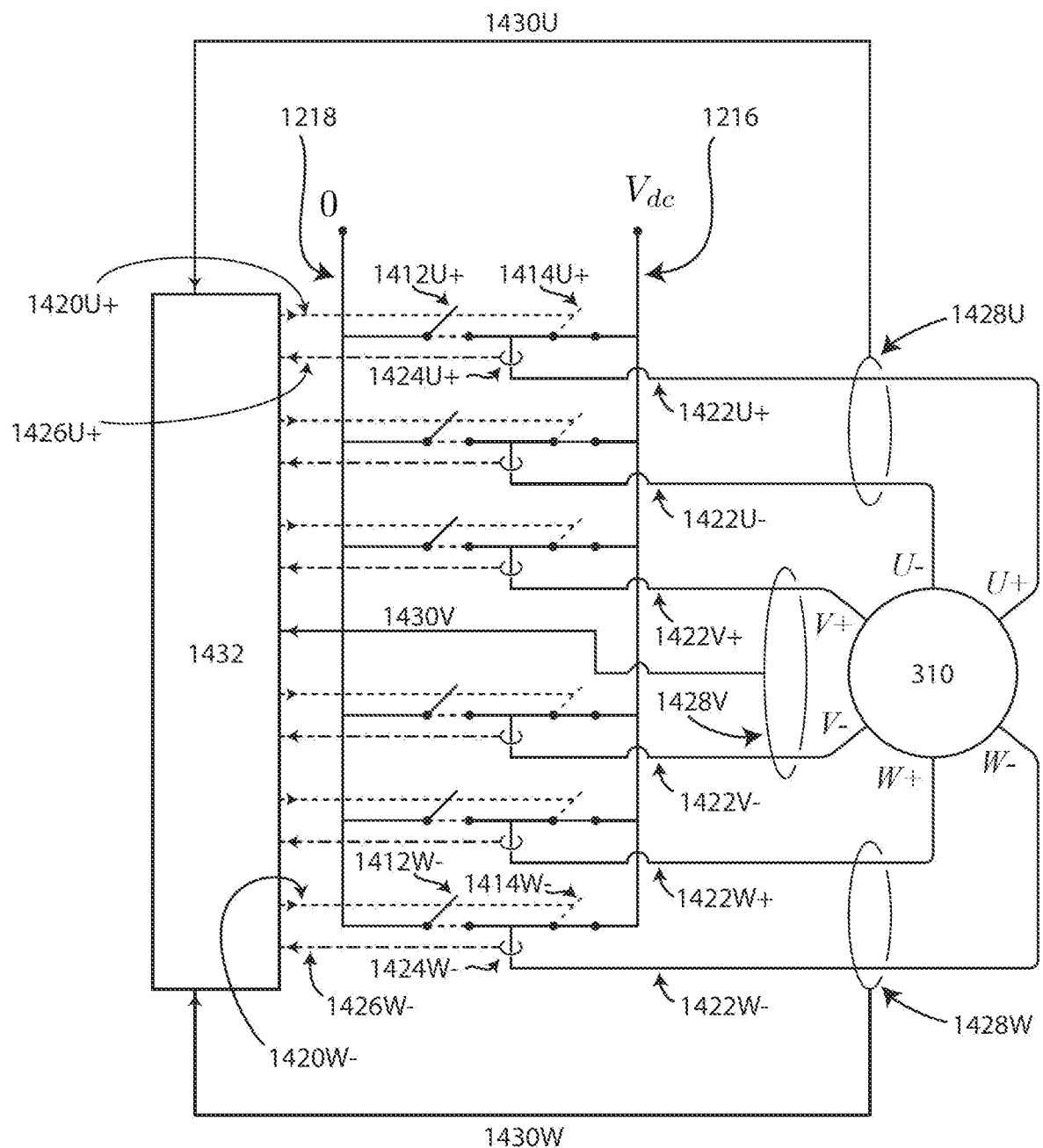
FIGS. 14A and 14B are circuit diagrams of power electronics system for controlling the motor wherein each terminal is independently controlled.
Figure 14B:
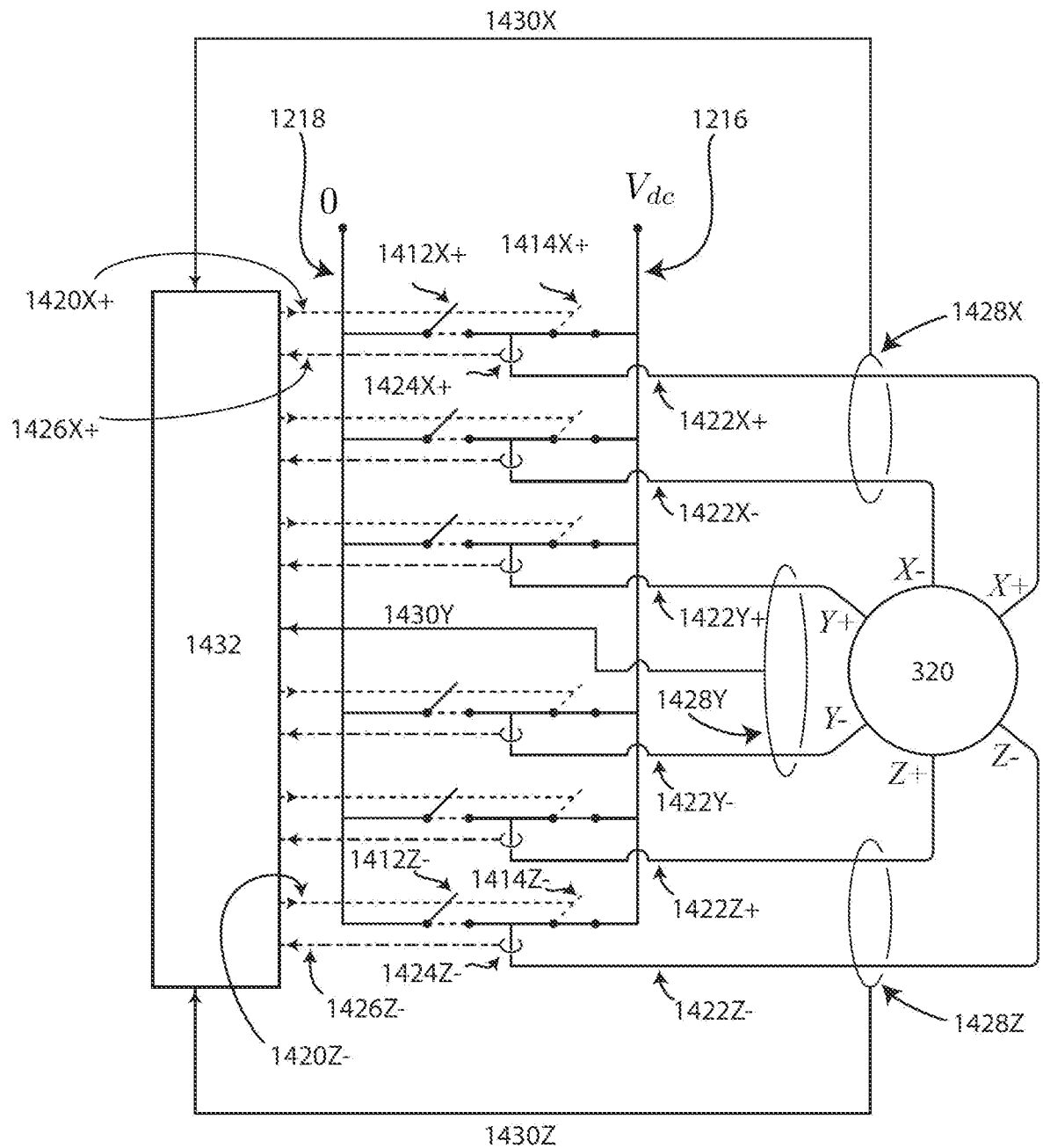

FIGS. 14A and 14B depict a motor control system for windings 310 and 320, respectively, for the unfused connection of FIG. 9 with description of operation for phase terminals U+, U−, V+, V−, W+ and W− in FIG. 14A and X+, X−, Y+, Y−, Z+ and Z− in FIG. 14B. Each phase is controlled independently with half-bridges operated by a controller 1432 based on input from sensors associated with each bridge. Controller 1432 receives inputs from current sensors 1424U+, 1424U−, 1424V+, 1424V−, 1424W+ and 1424W−, and 1424X+, 1424X−, 1424Y+, 1424Y−, 1424Z+ and 1424Z−. Additionally, common-mode current sensors 1428U, 1428V, 1428W, 1428X, 1428 Y, 1428Z and associated common mode signal lines 1430U, 1430V, 1430W, 1430X, 1430Y, 1430Z provide input to the controller 1432. During normal operation, the current into U+ is substantially equal to the current coming out of U−, and the net current through common mode sensor 1428U is substantially zero. Phase short faults are identified with a non-zero current above a predetermined level detected in one of the common mode sensors and provided on the associated common mode signal line to the controller 1432. Since there is parasitic capacitive coupling between the phases and between the phases and the other motor components, there will be some common mode current—especially during voltage switches of the power electronics where the time rate of change in voltage, dV/dt, is high.

As with the fused circuit implementation, the control circuits defined in FIGS. 14A and 14B may be duplicated for the two stator configuration of FIG. 2B.

Figure 15:
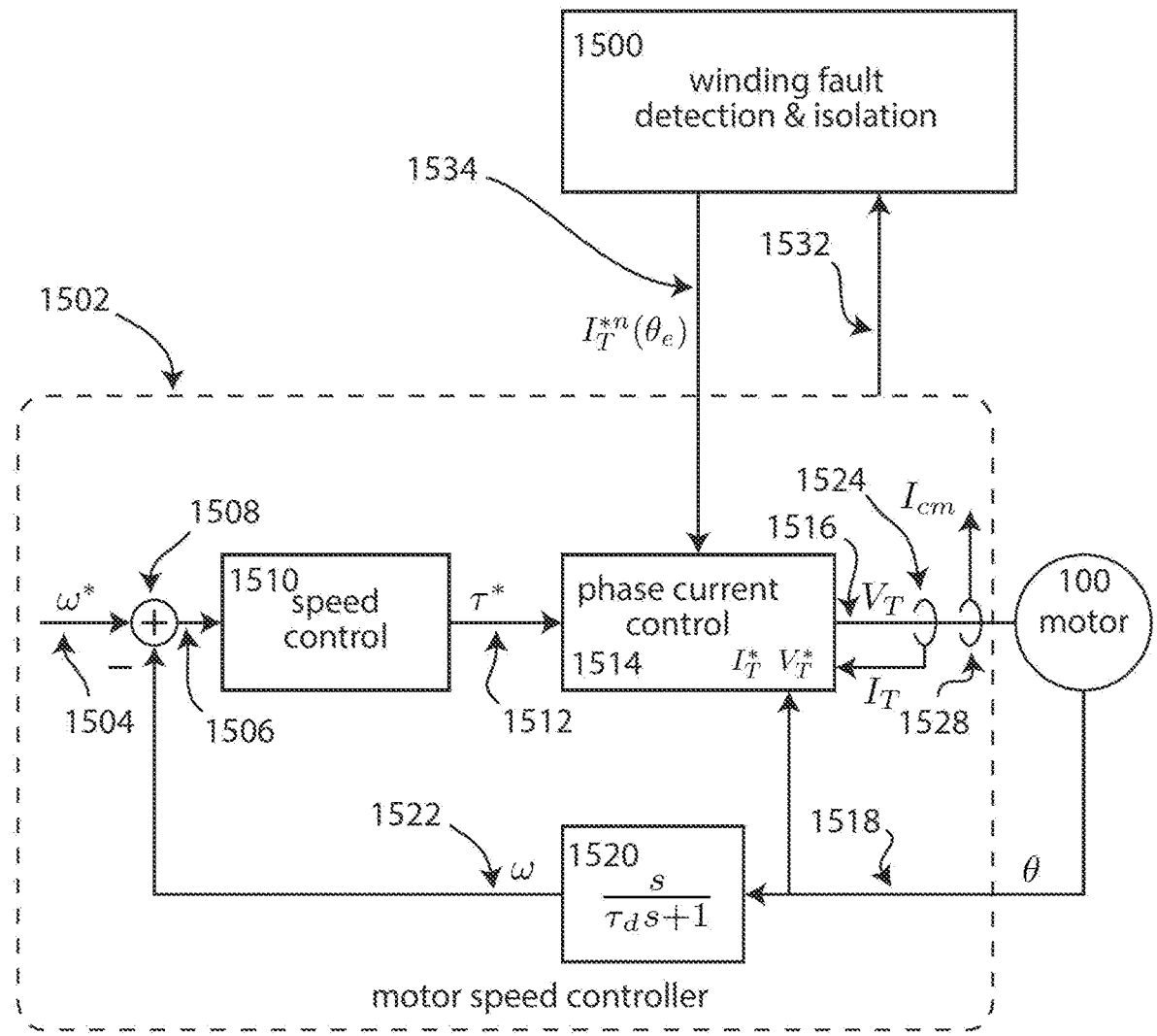
FIG. 15 is a block diagram of a motor speed controller with winding fault detection & isolation system; and, FIG. 16 is a fault detection & isolation system flow chart.

A motor speed controller 1502 and the fault detection & isolation system 1500 are implemented with software in the digital controller 1230 in FIG. 13 (or in the digital controller 1432 in FIGS. 14A and 14B) as shown in FIG. 15. The motor speed controller 1502, motor 100, and the winding fault detection & isolation system 1500 monitors system signals, generally designated as system signals 1532, which include the signal lines 1226U+, 1226V+, 1226W+, 1226X+, 1226Y+ and 1226Z+ from current sensors in FIG. 13 or signal lines 1430U, 1430V, 1430W, 1430X, 1430Y, 1430Z from the common mode sensors in FIGS. 14A and 14B and responds to faults by modifying the commutation current waveform $I^{*n}_T(\theta_e)$ 1534, which is a column vector of normalized phase current waveforms that depend on the motor de-sign and fault condition. The motor speed controller 1502 and the fault detection & isolation system 1500 are implemented with software in the digital controller 1230 in FIG. 13 (or in the digital controller 1432 in FIGS. 14A and 14B) and with the twelve transistor switches 1212U+, 1214U+, . . . , 1214Z+ in FIG. 13 (or with the twenty-four transistor switches 1412U+, 1414U+, . . . , 1414Z− in FIGS. 14A and B.)

The motor speed controller 1502 incorporates a possibly time-varying commanded speed ω* input 1504, which is differenced using junction 1508 with the actual motor speed ω input 1522. The speed error 1506 is supplied to the speed control block 1510 to produce a commanded torque τ*. The speed control block 1510 is typically a proportional+integral ("PI") type controller. The commanded torque τ* is used by the phase current control block 1514 to compute the individual phase terminal currents $I^*_T$ (shown as an internal signal in block 1514) according to $$I^*_T(t) = \tau^* I^{*n}_T(\theta_e(t)).$$

Since $I^{*n}_T(\theta_e)$ is the vector of commanded current signals normalized to produce an average torque of unity, the phase terminal currents $I^*_T(t)=\tau^* I^{*n}_T(\theta_e(t))$ produce an average torque of τ*. The phase current control block computes an internal commanded terminal voltage vector $V^*_T(t)$ representing the desired short-term average (over one PWM period) of the actual terminal voltage vector $V_T(t)$ applied at the motor connections 1516. Current sensors 1524 measure and feedback the actual phase terminal currents $I_T(t)$. In this implementation continuous functions of time are sampled, and control is implemented with discrete time calculations. In addition to the phase current sensing in 1524, common-mode currents can be measured when there are two phase connections per phase and common-mode currents are measured with common-mode sensors at 1528 to produce the vector $I_{cm}(t)$. Common mode current sensors are possible for the interconnections shown in FIGS. 14A and 14B at locations 1428U, 1428V, . . . 1428Z, but not in the system of FIG. 13.

The phase current control block 1514 achieves the desired value of $I_T(t)$ to close approximation via current feedback control. Such control is known in the art of motor control where field-oriented control (FOC) may be used that incorporates the Clarke and Park transformations (and their inverses) that are well-known for 3-phase motors. The Clarke transformation can be generalized for numbers of phases greater than 3 and the Park transformation and its inverse remains the same for numbers of phases greater than 3. Individual phase current control is also possible without the introduction of the Clarke and Park transformation.

The phase currents on the motor connections 1516 control the motor angle θ measured by an angle encoder and communicated on line 1518. The motor angle 1518 is input to the phase current control block 1514 for the purpose of computing the electrical angle $\theta_e=(N_p/2)\theta$, evaluating the commutation current waveform at the current value of electrical angle, and computing the commanded phase terminal currents. The motor angular velocity ω in 1522 is estimated using an approximate differentiation operation whose Laplace transfer function is shown in block 1520. Block 1520 is typically implemented in discrete time and the transfer function is approximated by the corresponding z-transform transfer function as is known in the art of signal processing and control.

Figure 16:
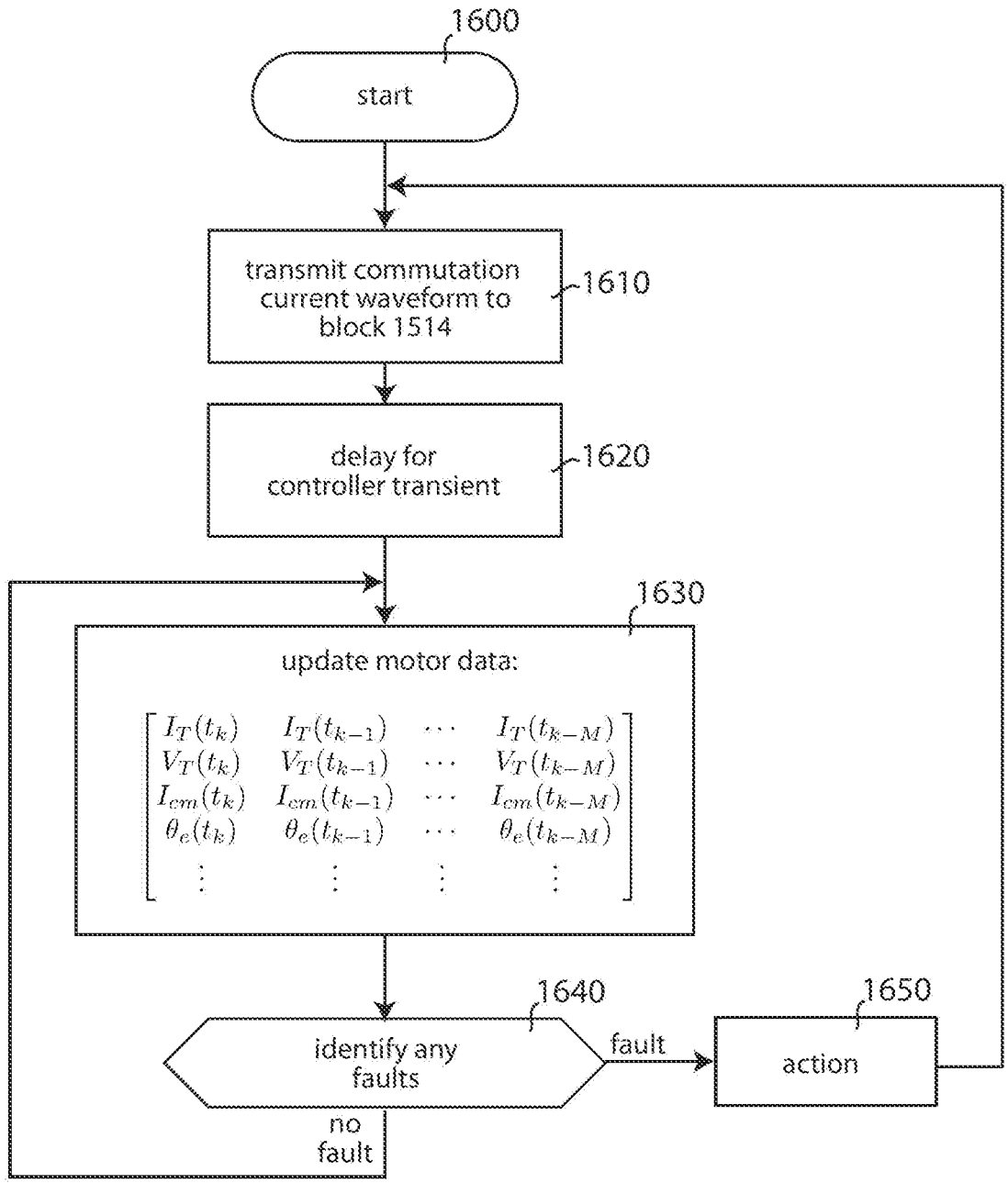

The motor speed controller 1502 as described for an example implementation illustrates that a number of currents, voltages, and other signals are naturally generated in the process of motor control and are available for winding fault detection & isolation. Other motor controllers are possible for motor angle control, motor torque control, and other control objectives, but all motor controllers will generate signals that can be used for winding fault detection & isolation. Such signals are communicated on line 1532 to block 1500. Representative signals are shown in block 1630 in FIG. 16, but other signals are possible. Also, not all signals shown are always used for winding fault detection & isolation FIG. 16 shows in flowchart form the software implementation for control and fault detection & isolation. In a recurring loop, the commutation current waveform for control is transmitted to the phase current control 1514. A delay for the controller transient 1620 allows settling of the motor data. The motor data is then updated 1630. Faults are then identified 1640.

Upon detection of a fault indicated by signal lines 1226U+, 1226V+, 1226W+, 1226X+, 1226Y+ and 1226Z+ from current sensors in FIG. 13 or signal lines 1430U, 1430V, 1430W, 1430X, 1430Y, 1430Z from the common mode sensors in FIGS. 14A and 14B the action 1650 is taken including the following:

For Fused Windings

| Fault | Action |
|---|---|
| Phase fail open 810 | Disconnect polyphase winding with open phase conductor. Update commutation waveforms on remaining polyphase winding for chosen fault performance*. |
| Phase-to-phase short 814 | Disconnect polyphase winding having shorted phases. Update commutation waveforms on remaining polyphase winding for chosen fault performance*. |
| Phase short to ground 818 | Disconnect affected polyphase winding. Update commutation waveforms on remaining polyphase winding for chosen fault performance*. |
| Feeder fault to ground 1234 | Disconnect affected polyphase winding. Update commutation waveforms on remaining polyphase winding for chosen fault performance*. |
| Feeder short to (or another phase feeder) 1232 | Disconnect polyphase winding having shorted phases. Update commutation waveforms on remaining polyphase winding for chosen fault performance*. |

*fault performance is chosen from a) constant torque at pre-fault torque level, b) constant torque at reduced torque level (to prevent overheating), c) torque waveform satisfying another performance objective and set of operational constraints.

For Fully Switched Windings

| Fault | Action |
|---|---|
| Phase fail open 810 | Disconnect polyphase winding with open phase conductor or the individual open phase conductor. Update commutation waveforms on remaining polyphase winding for chosen fault performance*. |
| Phase-to-phase short 814 | Disconnect polyphase winding having shorted phases or the individual shorted phases. Update commutation waveforms on remaining polyphase winding for chosen fault performance*. |
| Phase short to ground 818 | Disconnect affected polyphase winding or the shorted phase conductor. Update commutation waveforms on remaining polyphase winding for chosen fault performance*. |
| Feeder fault to ground | Disconnect affected polyphase winding or the affected phase. Update commutation waveforms on remaining polyphase winding for chosen fault performance*. |
| Feeder fault to another phase (or feeder) | Disconnect affected polyphase winding or one of the affected phases. Update commutation waveforms on remaining polyphase winding for chosen fault performance*. |
| Phase short faults identified with a non-zero current above a predetermined level detected in one of the common mode sensors | Disconnect affected polyphase winding or the affected phase. Update commutation waveforms on remaining polyphase winding for chosen fault performance*. |

*fault performance is chosen from a) constant torque at pre-fault torque level, b) constant torque at reduced torque level (to prevent overheating), c) torque waveform satisfying another performance objective and set of operational constraints.

If no fault is detected, the motor data is again updated 1630. If action has been taken for the fault 1650, a new commutation current waveform is transmitted 1610 to the phase current control 1514.

Isolation and disconnection of a polyphase winding or an individual phase conductor having a fault allows continued operation of the motor with adjustable performance degradation by compensation in control of the remaining one or more polyphase windings or the remaining active phases.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "upper" and "lower", "right" and "left", "inner" and "outer", "out-board" and "inboard", "aft" and "forward" are employed to describe relative positioning and other than for the specific implementations disclosed in the drawings and may be substituted with appropriate descriptors such as "first" and "second", "top" and "bottom" or "right" and "left" depending on orientation of actual implementation.

What is claimed is:

1. An axial flux electrical machine comprising:
   at least one permanent magnet rotor fixedly mounted on a rotating shaft;
   a stator having at least two polyphase windings disposed along a common axis with said shaft; and
   an insulation layer intermediate the at least two polyphase windings, said insulation layer comprising a polymer composite with a multilayer structure having a carbon fiber composite layer between two high dielectric external layers.

2. The axial flux electrical machine as defined in claim 1 wherein each of said polyphase windings produces a substantially identical current.

3. The axial flux electrical machine as defined in claim 2 wherein the first polyphase winding and second polyphase winding have matching electrical phase angles.

4. The axial flux electrical machine as defined in claim 3 wherein the first polyphase winding and the second polyphase winding have offset electrical phase angles.

5. The axial flux electrical machine as defined in claim 1 wherein each of said polyphase stators produces a different current.

6. The axial flux electrical machine as defined in claim 1 wherein each of the first and second polyphase windings have radially extending first phase leads and second phase leads and further comprising an insulation tab extending radially from the insulation layer between the first and second phase leads.

7. The axial flux electrical machine as defined in claim 1 further comprising:
   at least one sensor associated with each of the two polyphase windings;
   a controller connected to the at least one sensor of each of the two polyphase windings, said controller configured to disable a selected one of the two polyphase windings responsive to a fault indication from the at least one sensor associated with the selected one polyphase winding.

8. The axial flux electrical machine as defined in claim 7 wherein the at least one sensor comprises a current sensor on one phase conductor of the selected one polyphase winding.

9. The axial flux electrical machine as defined in claim 7 wherein the at least one sensor comprises a plurality of current sensors, one of said plurality of current sensors associated with each phase conductor of the selected one polyphase winding.

10. The axial flux electrical machine as defined in claim 7 wherein the at least one sensor comprises a plurality of common mode current sensors, one of said plurality of common mode current sensors associated with each phase of the selected one of the polyphase windings.

11. An axial flux electrical machine comprising:
at least one permanent magnet rotor fixedly mounted on a rotating shaft; and
at least one stator having a plurality of isolated polyphase windings disposed along a common axis with said shaft;
an insulation layer intermediate each adjacent isolated polyphase winding in the at least one stator;
a plurality of common mode current sensors associated with each of the polyphase windings; and
a controller connected to the plurality of common mode sensors of each of the polyphase windings, said controller configured to disable a selected one of the polyphase windings responsive to a fault indication from one of said plurality of common mode current sensors associated with the selected one of the polyphase windings.

12. The axial flux electrical machine as defined in claim 11 wherein each of said isolated polyphase windings produces a substantially identical current.

13. The axial flux electrical machine as defined in claim 11 wherein each of said isolated polyphase windings produces a different current.

14. The axial flux electrical machine as defined in claim 11 wherein the at least one stator comprises a first stator and a second stator, said first stator having a first polyphase winding and a second polyphase winding with a first intermediate insulation layer therebetween, said second stator having a third polyphase winding and a fourth polyphase winding having a second intermediate insulation layer therebetween.

15. The axial flux electrical machine as defined in claim 11 wherein the insulation layer comprises polyimide or polymer composite.

16. The axial flux electrical machine as defined in claim 15 wherein the polymer composite is fiberglass reinforced epoxy laminate.

17. The axial flux electrical machine as defined in claim 15 wherein the polymer composite is a carbon fiber carbon fiber composite.

18. The axial flux electrical machine as defined in claim 17 wherein the insulation layer comprises a multilayer structure having a carbon fiber composite layer between two high dielectric external layers.

19. A multi-current output axial flux electrical machine comprising:
at least one permanent magnet rotor fixedly mounted on a rotating shaft; and
at least one stator having a plurality of isolated polyphase windings disposed along a common axis with said shaft wherein each of said isolated polyphase windings have offset electrical phase angles; and
an insulation layer intermediate each adjacent isolated polyphase winding in the at least one stator, said insulation layer comprising a polymer composite with a multilayer structure having a carbon fiber composite layer between two high dielectric external layers.

20. The multi-current output axial flux electrical machine as defined in claim 19 wherein the at least one stator comprises a first stator and a second stator disposed along the common axis, and at least a portion of said plurality of isolated polyphase windings are disposed on the first stator and a second portion of the plurality of isolated polyphase windings are disposed on the second stator.

* * * * *